May 9, 1950 V. R. PAWELSKY ET AL 2,506,937
CONSTANT LEVEL LIQUID CONTROL DEVICE
Filed Sept. 27, 1946 3 Sheets-Sheet 1

INVENTORS
VERNON R. PAWELSKY
LOURDES V. McCARTY
WILLIAM A. BIERMANN
JOHN T. DULAK
BY John W. Michael
ATTORNEY May 9, 1950 V. R. PAWELSKY ET AL 2,506,937
CONSTANT LEVEL LIQUID CONTROL DEVICE
Filed Sept. 27, 1946 3 Sheets-Sheet 2

INVENTORS
VERNON R. PAWELSKY
LOURDES V. McCARTY
WILLIAM A. BIERMANN
BY JOHN T. DULAK
John W. Michael
ATTORNEY May 9, 1950  V. R. PAWELSKY ET AL  2,506,937
CONSTANT LEVEL LIQUID CONTROL DEVICE
Filed Sept. 27, 1946  3 Sheets-Sheet 3

INVENTORS
VERNON R. PAWELSKY
LOURDES V. McCARTY
WILLIAM A. BIERMANN
JOHN T. DULAK
BY John W. Michael
ATTORNEY Patented May 9, 1950

2,506,937

UNITED STATES PATENT OFFICE 2,506,937

CONSTANT LEVEL LIQUID CONTROL DEVICE

Vernon R. Pawelsky, Lourdes V. McCarty, William A. Biermann, and John T. Dulak, Milwaukee, Wis., assignors to Automatic Products Company, Milwaukee, Wis., a corporation of Wisconsin Application September 27, 1946, Serial No. 699,758

7 Claims. (Cl. 236—9)

1

This invention relates to improvements in liquid flow control devices of the constant level type and particularly to such device with a plurality of control means by which the device is made responsive to changes in a condition in a plurality of locations remote from the device.

It is therefore one object of the present invention to provide a constant level type of liquid flow control device with means for quickly interrupting discharge of liquid from the device in response to a change in a condition in one location remote from the device.

Another object of the invention is to provide a constant level type liquid flow control device with means for forcibly closing the outlet valve of the device upon increase in the value, above a predetermined limit, of a given condition in a location remote from the device.

Another object of the invention is to provide a constant level type liquid flow control device with means for rapidly closing and holding the outlet valve of the device closed when a given condition in a particular location exceeds a limit value and to provide means for re-setting the valve closing and holding means only after the given condition changes to a value below the limit.

A further object of the present invention is to provide a liquid flow control device with a plurality of control means severally responsive to change in a condition in a plurality of locations remote from the device, the means severally acting to close the outlet valve rapidly and gradually to a predetermined limit as required by the changes in the several conditions.

A further object of the invention is to provide a liquid flow control device with a single compound leverage on which a plurality of control means act differently to control the degree of closing of the outlet valve of the device as required by abnormal and normal conditions resulting from flow of the liquid.

Another object of the invention is to provide a liquid flow control device of the constant level type with a plurality of levers individually actuated by mechanically and electrically activated control means responsive to changes resulting from flow of liquid through the device and actuating a single lever in different ways dependent on the effect of flow changes in the different locations of the control means.

And a further object of the invention is to provide a constant level type of liquid flow control device with a compact arrangement of the minimum number of moving parts to secure closing of the outlet valve in different ways responsive to changes in conditions in a number of remote locations affected by change in the degree of opening of the valve.

Objects and advantages other than those above set forth will be apparent from the following description when read in connection with the accompanying drawing, in which.

Figure 1:
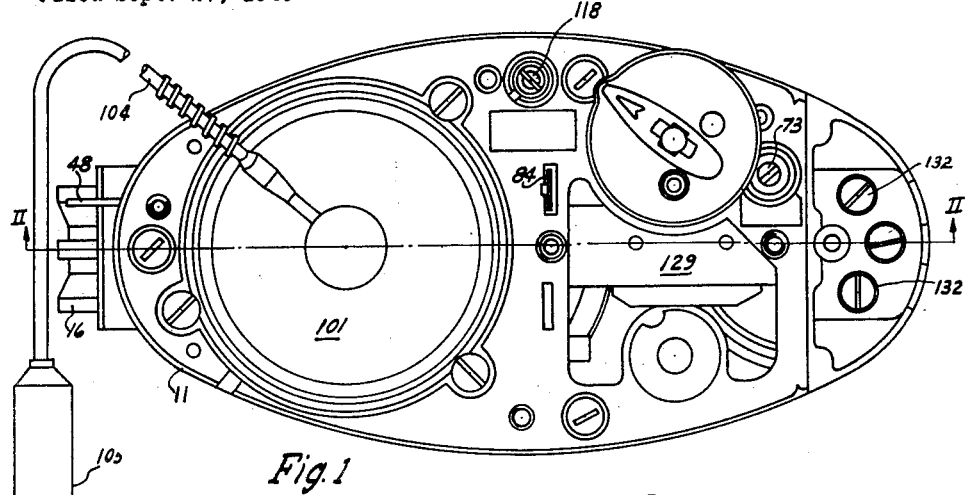
Fig. 1 is a top plan view with the cover plate removed from the device and omitting parts shown in other figures.

Generally, the present constant level type liquid flow control device includes a casing having an upper portion and a lower portion, the lower casing portion being substantially divided into two chambers and having a passage for the supply of a liquid thereto. Flow of the liquid into one of the chambers is controlled by an inlet valve biased to open position and urged toward closed position by a float. Means are provided for forcibly closing the inlet valve if the valve sticks in opened position so that the float is unable to close the valve. The discharge of liquid from the casing is accurately metered by way of an outlet valve of which the open position may be adjusted manually, or under the control of one or more pressure, temperature or other condition responsive means, dependent severally on a condition change in one of a plurality of locations remote from the device. The several control means are provided with limit stops by which the maximum and minimum flow of liquid through the outlet valve may be controlled. A single leverage is provided, which is actuated differently but jointly by the several condition responsive means, dependent upon whether or not the condition changes exceed predetermined limits. One of the control means forcibly and rapidly acts on the leverage to close the outlet valve quickly to its minimum limit position and hold the valve in its closed limit position until means are actuated, by which such control means and the leverage may be reset after each operation thereof. Another of the control means acts continuously and gradually on the leverage to provide a slow change in outlet valve position.

Referring particularly to the drawing, 10 designates the lower portion of the casing and 11 designates the upper portion thereof. The lower portion of the casing has a passage 12 formed in the wall thereof to receive a strainer 13 of relatively fine wire mesh which is attached at one end to an end piece 14 seating on a shoulder in the passage and suitably held therein by a pressure member 15 and an end cap 16 threaded into the inlet passage wall. The strainer is readily removable from the inlet passage, upon removal of the end cap, because of interconnection of the end cap and the strainer by a stem 17. The other end of strainer 13 has a ferrule-like member 18 embracing an extension 19 forming part of the inlet passage. The casing is substantially divided into a main chamber 20 and an auxiliary chamber 21 by a partial partition 22 with a notch 23 in the upper edge thereof to form a weir for the flow of liquid from the main chamber to the auxiliary chamber when the level of liquid in the main chamber exceeds a predetermined value. A hollow boss 24 connects the inlet passage 12 with the main chamber 20 of the casing.

The inlet boss 24 threadedly receives an inlet valve casing and seat member 27 which is substantially cylindrical and has ports therethrough above an internal shoulder. An inlet valve 28 of the needle type is reciprocally movable in the member 27 to seat on the edge of the shoulder. The valve has an externally threaded sleeve 29 fixed on a portion of the valve stem extending above the seat member 27. A flanged cup 30 is seated in inverted position on a flange of the sleeve 29 to receive one end of a spring 31 seated at the other end on an external flange of inlet valve casing 27 to urge the valve upwardly off its seat. The spring cup 30 supports a valve guide 32 engageable with a guide such as a rib 33 extending from the interior surface of the casing to prevent rotation of the valve in its casing during assembly of the parts. Both the spring cup and the guide are held in position by a nut 34 threaded on the sleeve 29 and compressing a spring 35 between the flanged rim of the cup and a seat formed therefor in the valve guide to lock the nut in a given position. The guide 32 is formed with a pair of diametrically located bosses (not shown) on which is placed a washer 36 to tilt as required in equalizing the pressure tending to close the valve.

A float 39 with an arm extending therefrom, is mounted on the casing chamber 20 on a pivot 41, the end of the float arm being forked with the ends rounded and bearing on the tiltable washer 36 to urge the valve toward closed position as the liquid level in the chamber 20 rises toward a predetermined height. Rotation of the valve during operation of the device is prevented by the bearing of adjacent edges of the float arm ends on opposite sides of the nut 34.

If the float 39 is unable to close the inlet valve for any reason, even though the liquid level has risen to the point where the maximum buoyancy of the float is exerted on the inlet valve, liquid flows through the weir notch 23 into the auxiliary chamber 21. Such chamber contains an auxiliary float 42 which is pivotally connected with lever 43. The float lever 43 is pivoted in the casing at 44 and the end of such lever adjacent the pivot, is formed as a jaw for receiving a plate 45 which can strike upon and drive the inlet valve into closed position upon movement of the auxiliary float to such height as to release the plate from the lever. The striker plate 45 is pivoted in a bracket 46 and is under the force of a tension spring 47 to swing the plate in a clockwise direction upon release thereof by the lever 43. The striker plate 45 must be reset after each operation thereof by means of a lever 48 which swings the striker plate back into position to be received in the jaw of the auxiliary float lever after the liquid in the auxiliary chamber has been removed. The striker plate, its mounting and reset lever are not a part of the present invention, and are not further described herein.

Figure 3:
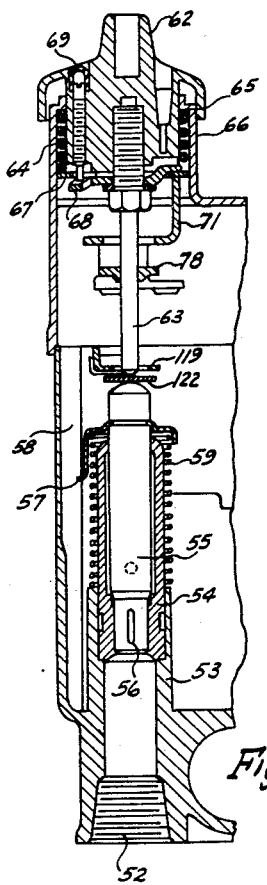
Fig. 3 is a fragment of the device, taken in vertical section on the plane of line III—III of Fig. 2.

Liquid flows from the main chamber 20 into an outlet passage 52 (see Fig. 3) partially defined by a hollow boss 53 extending into such chamber. The flow of liquid is controlled by an outlet valve comprising a substantially cylindrical casing 54 fixed in and extending from the outlet boss. An outlet valve 55 in the form substantially of a hollow cylinder, may seat in the valve casing and is provided with slots 56 registerable with ports through the valve casing whereby the flow of liquid from the chamber may be accurately metered. A guide member 57 is mounted on the outlet valve 55 and engages a guideway such as a rib 58 on the interior surface of the casing 10 to prevent rotation of the outlet valve in its casing. The guide member 57 also serves as a seat for one end of a spring 59, which is seated at its other end on the outlet boss 53 and which urges the outlet valve away from its seat. The degree of opening of the outlet valve may be determined by manual operation of a control knob 62 having a stud 63 which is indirectly engageable with the end of the valve. Such knob is under the action of a spring 64 acting between an anti-friction washer 65 seating in a flanged projection 66 from the upper portion 11 of the casing and a plate 67 fixed on the control knob and extending laterally therefrom to provide a seat for the spring. A resilient spiral strip 68 is fixed at one end on the control knob for flexing by means of a screw 69 extending through the knob, to provide a cam surface riding on an abutment whereby the valve closing position of the end of stud 63 relative to the end of the outlet valve may be varied as desired.

The abutment for the cam strip is a finger 71 projecting from a stiffly resilient arm 72 through which the control knob stud passes and which is fixedly positioned at one end thereof in the casing portion 11 while the other end thereof is positioned relative to the outlet valve by a screw 73 seated in the upper casing portion 11 and threaded into an aperture in the end of the arm, for limiting the degree to which the outlet valve may be closed by the control knob acting thereupon. A plate 74, co-acting with the adjusting screw 73, threadedly receives a screw 75 which is also threaded in the end of the arm 72, the screw 75 being provided with a flanged head providing a stop for portions of the leverage to be described. The other end of the arm 72 is positioned by a pin formed on the upper casing portion 11 and by one of the screws by which a bracket 77 is fixed in the upper casing portion.

The bracket 77 is formed with an arm 78 through which the control knob stud extends and in which such stud is guided. The bracket has a plurality of pairs of ears 79 and 80 respectively notched and apertured, has a lug 81 extending therefrom in the same direction as the ears and has a plurality of apertures 82 and 83 formed in the body of the bracket. The apertures 82 and 83 in one modification of the invention, severally receive generally similar reset plungers 84 and 85 which are supported and limited in their movement by the upper casing portion and are each formed with a lug 86 extending therefrom for several engagement with the leverage, and with one of the control means to be described. The plunger 84 has a leaf spring 87 attached to one side thereof for guiding such plunger in its movement through bracket aperture 82 and providing a definite stop determining upward movement of such plunger while downward movement is limited by another stop 88 formed on or fixed in the plunger and engageable with the upper casing portion.

Figure 8:
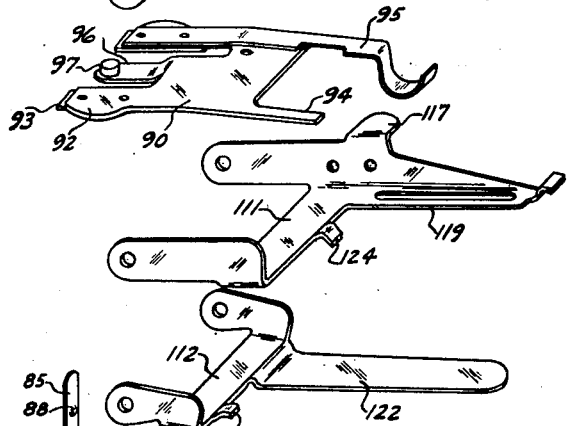
Fig. 8 is an isometric view of a modified form of one of the levers shown in Figs. 4 to 7.

The device is provided with a compound leverage which includes a toggle lever 90 attached to the bracket 77 by a tension spring 91. The toggle lever is provided with arms 92 having hardened knife-edged members 93 engageable in the notches of the bracket ears 79. The toggle lever may be modified to provide the two forms shown in Figs. 4 to 7 and 8 respectively. In the modification shown in Figs. 4 to 7, a plurality of arms 94, 95 extend from the lever 90 adjacent each other, the arm 94 being rigid while the arm 95 is a resilient member formed with a curved end to bear continuously on another portion of the leverage described below. In the modification shown in Fig. 8, the lever 90 is formed with arms 98 and 99 of which arm 98 is rigid and shaped to strike on other portions of the leverage when the toggle lever snaps over-center, as will be described while the arm 99 is formed as a straight leaf spring engageable by the lug of the reset lever 85 for resetting the toggle lever as will be described. Both modifications of the toggle lever are also provided with an arm 96 extending between the knife-edged arms 92, 93 and such arm has threadedly mounted therein a stud 97. The toggle lever stud 97, in one position of the toggle lever, is adapted to be engaged by a condition responsive means shown as comprising a chamber expansible in response to a temperature remote from the device.

The expansible chamber comprises a shell 101 to receive a flexible diaphragm 102 fixed in the shell as by soldering the edges of the shell, the diaphragm and a ring 103 for holding the diaphragm within the shell. The space defined by the shell and the diaphragm is connected by way of tube 104 with a bulb 105 to be located remotely from the control device itself; the bulb, the tube and the space between the shell and diaphragm being filled with a fluid which is readily expansible within the range of temperatures in which the device is to be used. The diaphragm 102 has suitably fixed thereon a stud 106 which extends through and is fixed in a leaf spring 107 seating in the upper casing portion 11 to position the expansible chamber therein and to bias the diaphragm for flexure in one direction. The stud 106 may move into contact with the toggle lever stud 97 to cause an over-center movement of such lever.

Figure 2:
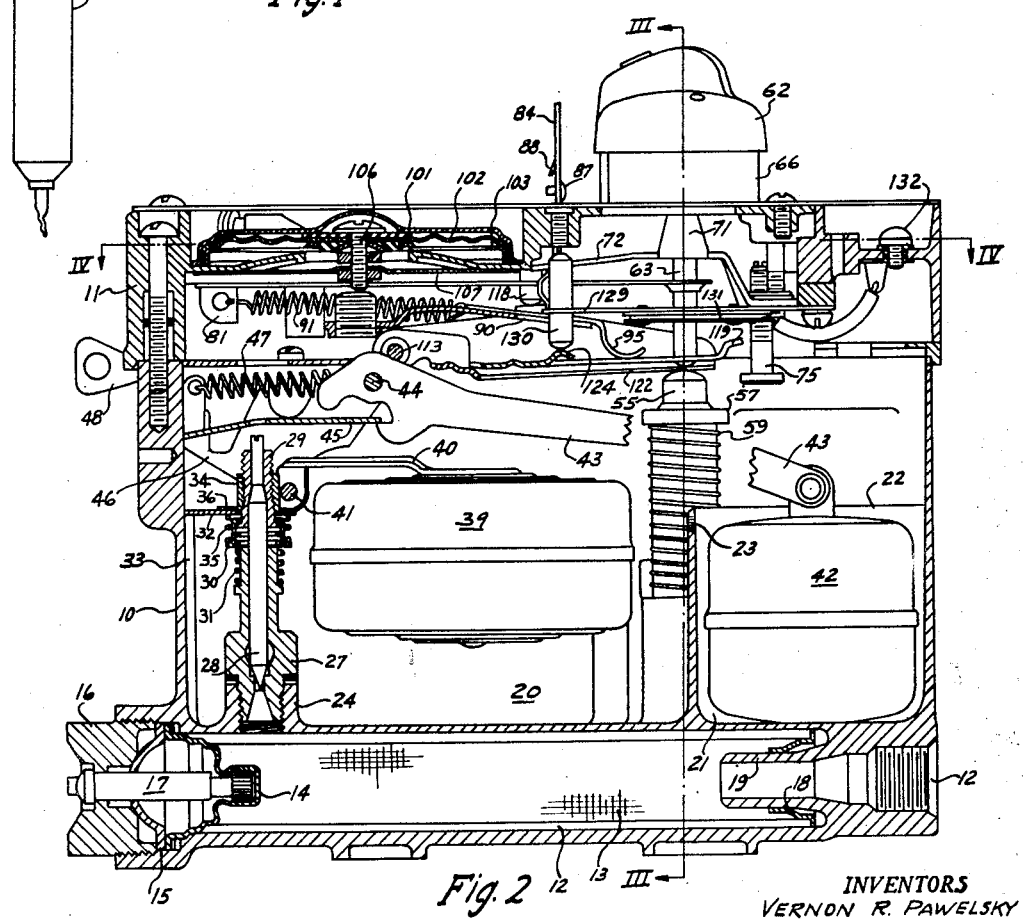
Fig. 2 is a vertical sectional view taken on the plane of line II—II of Fig. 1.

The leverage also includes a pair of levers 111 and 112 pivotally mounted on a pin 113 extending through the bracket 77, the lever 112 being the final lever of the single leverage. The lever 111 is positioned intermediate the toggle lever 90 and the final lever 112 and has an arm 117 extending laterally therefrom for engagement with a screw 118 (see Figs. 1 and 2) for limiting the degree of movement of the leverage in one direction and therefore limiting the maximum opening of the outlet valve. Another arm 119 extends from the intermediate lever 111 into position for engagement with the flanged head of the stop 75, thereby limiting the degree to which movement of the leverage may cause the outlet valve to close, the arm 119 being slotted to allow passage therethrough of the control knob stud 63 and arm 98 of the modified form of the toggle lever shown in Fig. 8. The final lever 112 has an arm 122 extending therefrom and underlying the slotted arm 119 of intermediate lever 111 for engagement on the outlet valve and by the end of the control knob stud and lever arm 98. The lever 112 is provided with an extension 123 for engagement with intermediate lever 111 so that raising of the lever 111 likewise raises the final lever 112 and the lever 111 is formed with an extension 124 which may be engaged by another condition responsive means for actuating the leverage.

Figure 9:
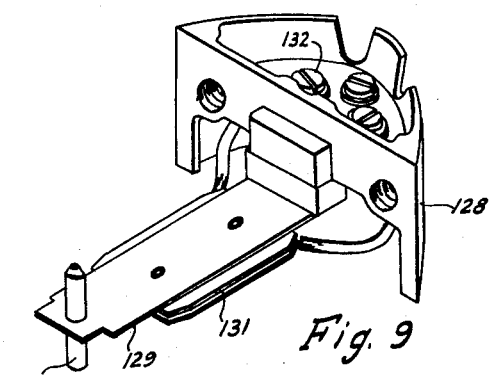
Fig. 9 is an isometric view of a portion of the structure shown in Figs. 1 and 2.
Figure 10:
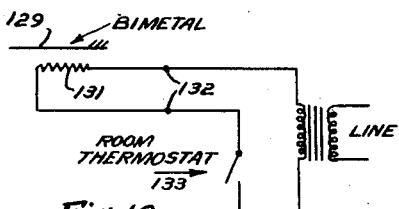
Fig. 10 is a wiring diagram of the thermostatic control.
Figure 4:
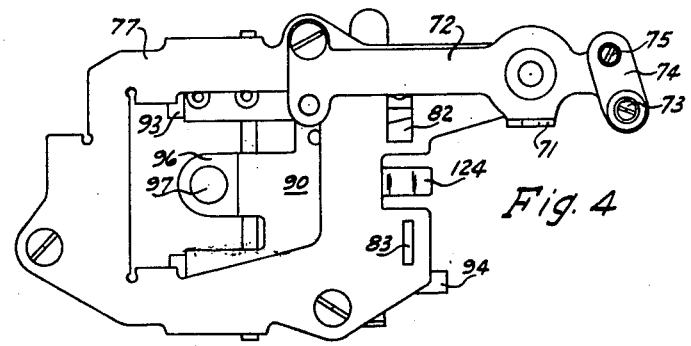
Fig. 4 is a top view of a portion of the structure looking down on plane IV—IV of Fig. 2.
Figure 5:
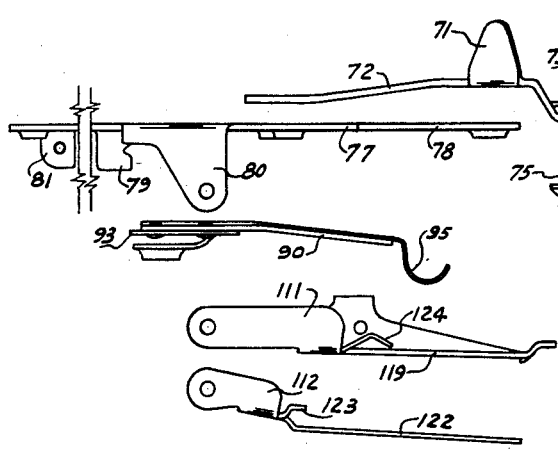
Fig. 5 is an expanded side elevational view of the structure shown in Fig. 4.
Figure 6:
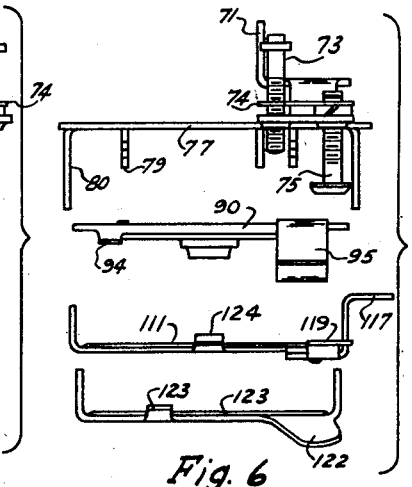
Fig. 6 is an end view of the structure shown in Fig. 5.
Figure 7:
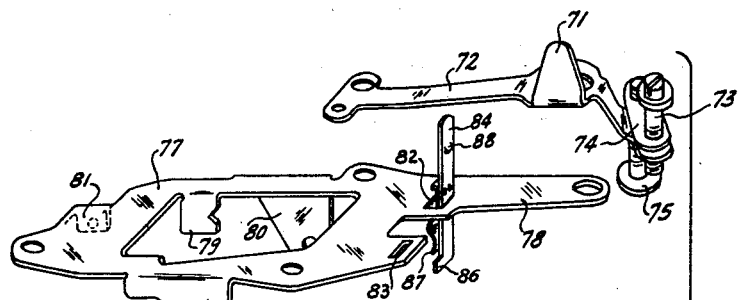
Fig. 7 is an exploded isometric view of the structure shown in Figs. 4, 5 and 6.

If the present device is to be jointly controlled by the expansive condition responsive means above described and by another condition responsive means such for example as a thermostat 133 (Fig. 10) which is located remotely from the device and from the condition responsive means above described, a heat motor such as is shown in Fig. 9 may be employed to actuate the leverage by acting on the extension 124 of intermediate lever 111. The heat motor comprises an electrical insulating material base 128 shaped to be mounted on the upper casing portion and preferably of a configuration such as to match the shape of the upper casing portion with that of the lower casing portion. The heat motor base supports a bimetal 129 extending into the upper casing portion and provided adjacent its free end with a pin 130 engageable with the lever extension 124. A heater 131 is carried by the bimetal and is adapted to be connected by way of the terminals 132 into the usual low voltage circuit under control of the usual thermostat 133. Such heater and its control are shown in Patent 2,317,063 issued to R. W. Johnson on April 20, 1943 and need not be further described herein. The bimetal is engageable by the lug of plunger 84 to raise and hold the pin 130 out of contact with intermediate lever extension 124, upon failure of electric current. The outlet valve then remains open and the device may be manually controlled by means of knob 62.

Assuming that the present device is to be used to control the flow of liquid fuel to a space heating furnace responsive to both the mechanical action of the bulb 105 located in the bonnet of the furnace and to the electrical action of a thermostat located in the space to be heated, the device is first adjusted by setting the screw 73 to place the abutment finger in the position to limit the maximum opening of the outlet valve by the control knob, and by positioning the stop 75 to limit closure of the outlet valve during normal operation and by adjusting the screw 118 to limit the degree to which the leverage permits the outlet valve to open during normal operation. Assuming further that both the space to be heated and the bonnet of the furnace are below the desired temperatures, the control knob is turned to allow the outlet valve to open to its maximum adjusted value. The toggle lever 90 is then in its raised position and the outlet valve in its opening movement, lifts levers 111 and 112. Fuel is now supplied to the furnace in the maximum desired quantity.

If the desired temperature is reached in the space to be heated without the occurrence of abnormal furnace bonnet temperature, the space thermostat will open the circuit of the heater 131 which will permit the bimetal 129 to warp and press the pin 130 on the lever arm extension 124. Such pressure will press lever 111 on lever 112 to close the outlet valve slowly until the arm 119 of lever 111 engages with the stop 75. The outlet valve is then closed to the position at which only a low fire is maintained. When the space temperature drops, the thermostat closes the circuit and the bimetal heats which relieves the pressure on the leverage and allows the outlet valve to re-open.

If for some reason the temperature in the bonnet of the furnace exceeds a safe value, the fluid in the bulb 105, tubing 104 and the chamber defined by shell 101 and diaphragm 102 expands and the diaphragm stud 106 presses on the stud 97 of the toggle lever 90. If a first form of the toggle lever 90 as shown in Figs. 4 to 7 is being used, the end of the spring 95 bears on the final lever arm 119 even though the toggle lever is in raised position while lifting of the second form of toggle lever shown in Fig. 8 into the raised position, lifts the arm 98 thereof above the final lever arm 119. In either case continued expansion of the chamber and increased pressure on the lever stud 97 causes the toggle lever to be moved over-center whereupon the axis of the spring 91 shifts and snaps the toggle lever downwardly. With the first form of the toggle lever, the over-center action presses the lever spring 95 on the final lever arm 119 at considerably greater force than heretofore, but such spring cushions the application of and absorbs some of the force. The spring is under tension and tends to return the toggle lever to its raised position as soon as the force of the expansible chamber is no longer effective. In use of the second form of toggle lever, over-center movement of the toggle lever causes the arm 98 to strike through the slot in the final lever arm 119. Hence, the valve closing force is quickly applied by both forms of toggle lever but is gradually applied by the first form of lever and is applied with appreciable impact by the second form of lever.

Contraction of the chamber and reflexing of the diaphragm 102 allows the first form of toggle lever to be swung back over-center due to the action of the spring 95. The second form of toggle lever however, must be reset by lifting the plunger 85 to engage the lever spring 99 and raise such second form of toggle to its former position. If the bonnet furnace temperature has returned to normal, such resetting will be effective to place the device entirely in operation. However, if the bonnet furnace temperature is still above a given value, the pressure of the fluid in the temperature responsive expansible means will again put the toggle lever into action to reclose the outlet valve.

It will thus be seen that the present device provides a well known constant level type of liquid flow control device with a single compound leverage in which two independently actuated levers act on a final lever to close the outlet valve as required. One of the independent levers is an over-center toggle which is actuated by mechanically activated means for rapidly closing the valve upon the occurrence of an abnormal condition, such as excessive temperature in one location and such mechanically actuated means includes an expansible chamber. The toggle lever action is applied to closing of the valve either gradually or by impact dependent on the form of toggle lever used. In the first form of toggle lever, the lever resets automatically while with the second form of toggle lever means are provided for resetting the lever manually as soon as such change in condition has occurred as will allow contraction of the expansible chamber. The other independently acting lever is constantly actuated by an electrically energized means responsive to a normal condition and includes a heat motor by which the outlet valve may be closed to any point required between maximum and minimum open position. Means are also provided for holding the electrically energized means out of operation if desired, and such means are effective regardless of the action of the heat motor.

Although but two embodiments of the present invention have been herein illustrated and described, it will be apparent to those skilled in the art that various changes and modifications may be made within the spirit of the invention and the scope of the appended claims.

We claim:

1. In a liquid flow control device, a casing adapted to receive a liquid, an outlet valve biased toward an open position and controlling the discharge of liquid from the casing, a bracket mounted in the casing, a leverage comprising a toggle lever mounted on the bracket, a spring connecting the bracket and the toggle lever for causing over-center snapping of the toggle lever, an expansible chamber mounted in the casing for actuating the toggle responsive to a condition in a location remote from the device, an intermediate lever, and a final lever acting on the outlet valve for closing the same and actuated independently by the toggle lever and the intermediate lever, a bimetal acting on the intermediate lever for gradually closing the outlet valve, and a heater for activating the bimetal responsive to change in a condition in another location remote from the device.

2. In a liquid fuel control device, a casing having an inlet and an outlet, a valve controlling discharge of liquid from the outlet and being biased toward its open position, a lever acting on the valve, manually operated means acting on the lever for controlling movements of the valve, another lever acting on the first said lever, a thermostatically controlled bimetal acting on said other lever to actuate valve movements, a toggle action lever, and temperature responsive means for moving said toggle lever to strike said other lever and move the valve to its closed position.

3. In a liquid fuel control device, a casing having an inlet and an outlet, a valve controlling discharge of liquid from the outlet and being biased toward its open position, a lever acting on the valve, manually operated means acting on the lever for controlling movements of the valve, another lever acting on the first said lever, a thermostatically controlled bimetal acting on said other lever to actuate valve movements, a toggle action lever, and temperature responsive means for moving said toggle lever to strike said other lever and move the valve to its closed position, said temperature responsive means comprising a vacuum charged diaphragm retained in the casing by a leaf spring biasing the diaphragm in a direction to actuate the toggle lever and close the valve in the event the vacuum charge within the diaphragm is lost.

4. In a liquid fuel control device, a casing having an inlet and an outlet, a valve controlling discharge of liquid from the outlet and being biased toward its open position, manually actuatable means for controlling movement of said valve, a lever mounted within the casing and being adapted to transmit movement of said manual means to said valve, another lever acting on the first named lever, and a plurality of temperature responsive means acting on said other lever.

5. In a liquid fuel control device, a casing having an inlet and an outlet, a valve controlling discharge of liquid from the outlet and being biased toward its open position, manually actuatable means for controlling movement of said valve, a lever mounted within the casing and being adapted to transmit movement of said manual means to said valve, another lever acting on the first named lever, a plurality of temperature responsive means acting on said other lever, and means for rendering one of said temperature responsive means inoperative while retaining operability of the other temperature responsive means and of the manual means.

6. In a liquid fuel control device, a casing having an inlet and an outlet, a valve controlling discharge of liquid from the outlet and being biased toward its open position, a lever acting on said valve for controlling movements thereof between its low and high fire positions, first temperature responsive means acting through said lever to move said valve to the high fire position when the temperature at a first location drops below a predetermined value and to return the valve to the low fire position when the heat demand is satisfied, second temperature responsive means acting through said lever to move the valve to its low fire position when the temperature at a second location exceeds the predetermined value, means for rendering said first temperature responsive means inoperative, said second temperature responsive means being fully operative when said first temperature responsive means are inoperative.

7. In a liquid fuel control device, a casing having an inlet and an outlet, a valve controlling discharge of liquid from the outlet and being biased toward its open position, manually actuatable means for controlling movement of said valve between its closed position and its high fire position, a lever acting on said valve for controlling movements thereof between the low fire position and the high fire position, first temperature responsive means acting through said lever to move said valve to the high fire position when the temperature at a first location drops below a predetermined value and to return the valve to the low fire position when the heat demand is satisfied, second temperature responsive means acting through said lever to move the valve to its low fire position when the temperature at a second location exceeds a predetermined value, and means for rendering said first temperature responsive means inoperative, both said manual means and said second temperature responsive means remaining fully operative when said first temperature responsive means are inoperative.

VERNON R. PAWELSKY.
LOURDES V. McCARTY.
WILLIAM A. BIERMANN.
JOHN T. DULAK.

REFERENCES CITED

The following references are of record in the file of this patent:

UNITED STATES PATENTS

| Number | Name | Date |
| --- | --- | --- |
| 1,980,789 | Dillman | Nov. 13, 1934 |
| 2,183,854 | Landon | Dec. 19, 1939 |
| 2,185,978 | Dillman | Jan. 2, 1940 |
| 2,286,137 | Johnson | June 9, 1942 |
| 2,305,429 | Johnson | Dec. 15, 1942 |
| 2,317,063 | Johnson | Apr. 20, 1943 |
| 2,353,498 | Perry | July 11, 1944 |
| 2,372,436 | Landon | Mar. 27, 1945 |